United States Patent                                                 [11] 3,620,900

| [72] | Inventor | Ervin J. Williger |
|------|----------|------------------|
|      |          | Tallmadge, Ohio |
| [21] | Appl. No. | 766,947 |
| [22] | Filed | Oct. 11, 1968 |
| [45] | Patented | Nov. 16, 1971 |
| [73] | Assignee | The General Tire & Rubber Company |

[54] PLASTIC LAMINATE STRUCTURE HAVING ELASTOMER PARTICLES IN ALTERNATE LAYERS
6 Claims, No Drawings

[52] U.S. Cl............................................................. 161/162,
161/158, 161/170, 161/174, 161/195, 161/233,
161/241, 161/242, 161/248, 161/253, 161/254,
161/255, 161/256, 161/257, 161/404, 260/3,
260/14, 260/15, 260/824, 260/826, 260/838,
260/849, 260/860, 260/862

[51] Int. Cl........................................................ B32b 5/16,
B32b 5/28

[50] Field of Search............................................ 161/87,
162, 158, 174, 41, 76, 144, 195, 231, 239, 241,
242, 248, 170, 233, 253, 254, 255, 257, 404;
260/2.3, 3, 4, 86 Z, 3.4, 862

[56]                References Cited
          UNITED STATES PATENTS

| 1,778,185 | 10/1930 | Devries .......................... | 161/162 X |
| 2,684,351 | 7/1954 | Williams........................ | 260/43 |
| 2,723,207 | 11/1955 | Hall et al. ..................... | 260/3 X |
| 2,865,800 | 12/1958 | Stasny ........................... | 161/162 X |
| 3,026,223 | 3/1962 | Vanderbilt et al. ............ | 260/4 X |
| 3,047,534 | 7/1962 | Dyer et al. ..................... | 260/4 X |
| 3,144,420 | 8/1964 | Fryling .......................... | 260/4 |

OTHER REFERENCES

Whittington, Lloyd R., Whittington's Dictionary of Plastics, Technomic pub. Co., Stamford, Conn. (7- 1968) pages 2,208, and 239 relied on. Copy in Group 160.

*Primary Examiner*—Harold Ansher
*Assistant Examiner*—W. E. Hoag
*Attorneys*—Frank C. Rote, Jr., John J. Murphey and Denbigh S. Matthews

ABSTRACT: This invention concerns a laminate, possessing high reverse impact strength, comprising layers of thermosetting resin wherein alternate layers and the outermost layers, have incorporated therein a dispersion of elastomeric particles.

PLASTIC LAMINATE STRUCTURE HAVING ELASTOMER PARTICLES IN ALTERNATE LAYERS

BACKGROUND OF THE INVENTION

1. Field of the Invention

This invention relates to the field of laminate structures. More particularly, this invention relates to thermosetting resin laminates and to a novel laminate that is resistant to cracking from light impacts.

2. Description of Prior Art

Laminated plastics are finding increased utilization in areas heretofore occupied by cast, stamped, and forged metals such as household appliance housings, office equipment, and automobile exteriors. Laminates, especially fiber-reinforced laminates, possess many advantages over their metal counterparts such as higher strength to weight ratios, better corrosion resistance, and better finish retention. Current research in laminating techniques has expanded the applicability of laminates to still other uses.

One problem faced by users of laminated plastics that has not been experienced by metal users is reverse impact crack propagation. Whereas a metal surface remains unaffected, or at most slightly dented, when struck lightly, a rigid plastic laminate will often crack under the same conditions. This occurs in many laminates including the toughest, strongest, fiber-reinforced thermosetting resin laminates.

The reason for reverse impact crack propagation lies in the rigidity of the plastic matrix making up the laminate. A thermosetting resin, fiber-reinforced laminate, the most widely used combination where high strength is required, is a partnership between hard thermosetting resin and strong fibers. The resin provides a hard matrix with high flexural rigidity and the fibers provide high tensile strength. While these properties are combined in the laminate to produce a material of extreme toughness and hardness, the fiber impregnated matrix itself is insufficiently flexible to absorb or dampen point injected energy. A light impact, such as a stone thrown against the laminate, represents a point injection of energy somewhat like a hypodermic injection. The rigidity of the plastic matrix causes instantaneous transfer of this injected energy through the laminate to the opposite side placing that surface under immediate elongation stress. Close observation of a fiber-reinforced thermosetting resin laminate surface shows that it contains many dimples, pits, and bumps which serve as crack starters for this stressed surface condition. A crack develops in this rough, stressed surface and the injected energy is directed to the base of the crack through surface tension phenomena. The energy then seeks to expend itself by driving the crack deeper into the matrix.

As the crack progresses, it may or may not come upon a fiber. Fibers, usually glass fibers, provide strength to the laminate. They are quite hard and not capable of absorbing small concentrations of energy. Therefore, the crack ignores the fiber and continues to progress deeper into the laminate until its driving energy is expended. The result of this phenomena is a crack in the laminate surface opposite the impact point, hence the term "reverse impact."

This reverse impact crack propagation problem at first blush seems inconsistent with the strong, energy absorbing nature of fiber-reinforced thermosetting resin laminates. The severe impacts given these laminates, however, are usually given over a wide area which allow the laminate to flex and absorb the energy whereas the light impacts that cause reverse impact crack propagation are given in point areas, where the laminate cannot flex. This phenomena shows up in such things as laminated automobile bodies where visual cracks appear on finder tops when a stone has been thrown up against the underside of the fender.

The prior art has attempted to solve this problem by observing the phenomenon and seeking ways to increase reverse impact strength. In defining reverse impact strength, note should be taken of conventional impact strength; that is, the amount of energy required to ultimately break the test specimen. Reverse impact strength is defined as the energy required to cause reverse crack propagation. This energy has not yet been directly measurable because the test specimen flexes upon impact indicating that some of the energy is absorbed and not used in crack formation. It has, therefore, been expedient to measure reverse impact strength on an arbitrary scale, such as the height in inches a test ball must be dropped before cracks appear in the test specimens struck by the ball. This measurement has been accepted in industry by those who are directly interested in reverse impact strength—most notably the automobile industry.

The test is simple to conduct. A ½-pound smooth steel ball is dropped from various heights onto a fixed test panel and the opposite side of the panel examined for cracks. The examination may be made with the aid of fluorescent dyes; however, most cracks are visible and dyes are not normally used. The results are reported as "cracks at inches" meaning that cracks appear in the test panel when the ball is dropped so many inches.

One attempt to increase reverse impact strength was to soften the thermosetting resin so that the injected energy could be expended in local matrix flexing. This was done in various ways such as using a lower molecular weight thermosetting resin and reducing the degree of cross-linking within the matrix. Although these methods increased reverse impact strength, they caused lowering of the flexural rigidity and overall strength of the laminate below acceptable limits. This seemed to foreshadow the difficulty of increasing reverse impact strength while at the same time not changing any other property to an undesirable level.

An attempt was then made to cover the laminate with a layer of softer polymer such as a thermoplastic resin. It was immediately noted that the laminate surface hardness decreased below acceptable levels.

The prior art then sought to chemically incorporate an elastomer into the thermosetting resin to soften the matrix. This polymerization route is extremely difficult as the elastomer must fit an almost unachievable variety of requirements, such as being soluble in the thermosetting resin compound, being capable of cooperative polymerization in the cross-linking reaction and being polymerizable in the catalyst system used for cross-linking. The few successful attempts (e.g., high-impact polystyrene) have been limited to thermoplastic resins that characteristically possess a low hardness, a low tensile strength, and a low heat distortion temperature. These are unacceptable substitutes for strong, fiber-reinforced thermosetting resin laminates. The problem of reverse impact crack propagation, therefore, remains unsolvable except in those instances where a compromise of other laminate physical properties is permitted.

Accordingly an object of this invention is a thermosetting resin laminate having a high reverse impact strength.

Another object of this invention is a laminate having a high reverse impact strength in combination with the characteristic physical properties of thermosetting resin laminates.

Another object of this invention is a laminate having a high reverse impact strength without a sacrifice in strength, hardness, heat distortion temperature or other characteristic physical property of fiber-reinforced, thermosetting resin laminates.

SUMMARY OF THE INVENTION

This invention concerns a laminate, possessing high reverse impact strength, comprising layers of thermosetting resin wherein alternate layers, and the outermost layers, have physically incorporated therein a dispersion of elastomeric particles. The elastomeric particles provide points of local flexing, in an otherwise rigid matrix, where point injected energy from light impacts may be expended or absorbed.

DESCRIPTION OF THE PREFERRED EMBODIMENT

Although plastic laminates appear in many forms, those of interest and most benefited by this invention are laminates made from thermosetting resins. These laminates may or may not be fiber reinforced as the invention is operable in either case without exception; however, since most commercially available thermosetting resin laminates are glass fiber-reinforced polyester resin laminates, the description will be directed to this latter type. This should not be construed to mean that only glass fiber-reinforced polyester resin laminates will benefit from this invention. On the contrary, thermoplastic and thermosetting resin laminates, including mixtures thereof, with or without fiber reinforcing are operable with this invention. Examples of just a few resins that are operable herein are thermoplastic resins such as polyvinyl chloride, polystyrene, cellulose acetate, acrylonitrile-butadiene-styrene (ABS) terpolymers, and polyethylene; and thermosetting resins such as phenolics, urea resins, and melamine formaldehyde resins. From a practical viewpoint, thermoplastic resin laminates are restricted to a nominal temperature range because of their characteristic low heat distortion temperature and, in addition, are generally soft and flexible so that they are not troubled by reverse impact crack propagation. Also from a practical viewpoint, most thermosetting resins are rigid and hard and do suffer reverse impact crack propagation. Therefore, for the sake of conciseness and clarity, the invention will be described in terms of the commercially popular glass fiber-reinforced polyester resin laminate. However, it must be kept in mind that other plastic laminates, with and without fiber reinforcement, are operable herein.

In general, in this invention, particles of elastomeric material are physically dispersed in alternate layers and the outermost layers of the polyester resin laminate. This is accomplished by admixing the elastomer, in powder form, with the other additives, such as the catalyst and the fillers, during resin compounding. The resin compound is then impregnated into a glass fiber mat and the laminate assembled.

Most commercially available polyester resins are the products of an esterification, condensation-type reaction between a dibasic acid and polyhydric alcohol cross-linked with an ethylenically unsaturated polymerizable monomer. The dibasic acids are usually unsaturated dicarboxylic acids and anhydrides such as maleic anhydride, fumaric acid, and itaconic acid. Saturated dicarboxylic acids and anhydrides such as adipic acid, phthalic anhydride, isophthalic acid, terephthalic acid, and hexahydroterephthalic acid may replace part of the unsaturated acid. The polyhydric alcohols are usually glycols such as ethylene glycol, diethylene glycol, propylene glycol, the 1,2-, 1,3-, and 1,4-butane diols, trimethylene glycol, the 1,2-, 1,3-, 1,4-, and 1,5-pentene diols, and glycerol. The unsaturated polyester is usually cross-linked with vinyl-type monomers, in the presence of a free-radical generating catalyst and polymerization inhibitor, to form a three-dimensional, stable copolymer. Cross-linking monomers such as styrene, vinyl toluene, acrylic acid, and methacrylic esters are used with catalysts such as organic peroxides and azo-type compounds in the presence of inhibitors such as quinones and catechols. The exothermic cross-linking reaction is usually driven to completion by application of heat such as in a hot mold or press; however, the reaction may be made to self-initiate and progress to completion without externally applied heat.

Reinforcement in polyester resin laminates is preferably accomplished with glass fibers. Heat resistant asbestos fibers have poor tensile properties and strong polymeric fibers such as DACRON (trademark) have poor high temperature strength properties. Glass fibers, in comparison, maintain adequate tensile properties over a wide temperature range. The glass fibers may be staple fibers or continuous fibers. With staple fibers care should be taken not to use so short a length that the reinforcing advantage of the fiber is lost. Much of the staple fiber used in industry is in lengths of about one-fourth inch and longer.

Laminates are generally made by impregnating a layer or mat of continuous or staple glass fibers with the uncured polyester resin compound, assembling the desired number of layers into a laminate, and curing the laminate in a press or match-mold. An alternate method is to mix a small amount, e.g., 1–15 parts per 100 parts resin, of magnesium oxide into the uncured resin per the teachings of Fisk in U.S. Pat. No. 2,268,209. A glass fiber mat is impregnated with the resin compound and covered on both sides with a protective layer such as a polyethylene film. After a period of time, varying between a few hours and a few days, depending upon the amount of magnesium oxide added, the protective layer is stripped from the impregnated mat. The uncured layer is now a plyable, tack-free, easily workable material. The desired size and number of layers can be cut from this material, the laminate assembled and cured as described earlier.

In this invention, point injected energy will expend itself by flexing one or more of the physically dispersed elastomeric particles and greatly reduce or totally eliminate reverse crack propagation. The energy transferred from point of impact to the opposite laminate surface will be partly expended or absorbed as it passes through the alternate laminate layers containing the dispersed elastomer particles. The particles in these rigid polyester resin impregnated glass fiber layers will individually flex and absorb energy. When the reduced energy reaches the opposite laminate surface, more of it is absorbed as the elastomeric particles on the surface flex to relieve the rising elongation stress. If sufficient energy remains to initiate a crack, it is quickly expended as the crack meets the subsurface particles. Because the particles are uniformly dispersed in the outermost layers, crack propagation is confined to a depth in those layers between the surface and the underlying, adjacent particles.

The elastomeric particles thus perform a variety of functions: the particles in the alternate layers within the laminate flex to absorb energy that passes from the impact point through the laminate to the opposite surface; the particles on the surface, opposite the impact point, flex to relieve the rising surface elongation stress; and the particles in the outermost layer, opposite the impact point flex to relieve residual, unabsorbed energy that manifest itself in minor surface cracking. Crack propagation is thus totally eliminated for most point energy injections (e.g., small and medium stones hitting the surface) and confined to the outermost layer for higher point energy injections (e.g., large stones hitting the surface).

The heterogeneous phase of physically dispersed elastomeric particles does not noticably reduce the surface hardness of the laminate because the greater percentage of the surface is occupied by polyester resin. The presence of the surface is occupied by polyester resin. The presence of the particles also does not detrimentally affect other laminate physical properties. This is in contrast to the prior art attempts in increase reverse impact strength by using a homogenous energy absorbing mechanism (e.g. softer polyesters, reduced cross-linking) and chemical incorporation of elastomers that seriously reduce overall laminate strength. Furthermore, only alternate layers and the cover layers of the laminates require this physical dispersion of elastomeric particles to reduce crack propagation so that the laminate's strength is totally unchanged in those layers without elastomeric particles. It should be appreciated that dispersing elastomeric particles in all the laminate layers would not significantly increase the reverse impact strength over that obtained using only alternate and cover layer dispersions over that obtained using only alternate and cover layer dispersions and would most probably deteriorate the laminate's overall physical strength e.g., flexural rigidity. In contrast, dispersing elastomeric particles in alternate laminate layers without dispersing particles in the cover layers will not significantly raise reverse impact strength over laminates that do not incorporate this invention. This is because the elastomeric particles in the cover layers perform most of the crack preventing function. Without these particles in the cover layers, the presence of elastomeric particles in the laminate interior provides little crack-prevention.

This invention may be successfully practiced with a wide range of elastomeric materials. Some examples are natural rubbers and synthetic rubbers such as acrylic rubbers, chlorosulfonated polyethylenes, epicholorohydrin rubbers, ethylene-propylene copolymers, ethylene-propylene-diene terpolymers, fluoroelastomers, isobutylene-isoprene (butyl) rubbers, isoprene-acrylonitrile rubbers, nitrile rubbers, polybutadienes, polychloroprenes, polyisobutylenes, polyisoprenes, polysulfides, silicone rubbers, stryene-butadiene rubbers, and urethanes. Liquid rubbers, i.e., elastomers existing in a normally liquid form at room temperature, have not proven operable in the invention.

The size of the physically dispersed elastomeric particles, usable in this invention, cannot be accurately delineated. This is because the particles do not take the classical form of sphereoids, as do more granular materials such as crushed rock, but are highly irregular and distended in shape. Moreover, as described later, the particles have a powdered filler associated with them, due to the method of incorporating and dispersing them, which would confuse any attempt at particle sizing. Quite logically, the particles should not be so small as to be incapable of energy absorption; i.e., nonflexible, and, additionally, not be so large as to crack formers themselves. Successful results have been achieved using elastomers having a mean particle diameter between 0.1–300 microns.

The amount of elastomer physically dispersed in the laminate layers may be varied to provide a range of reverse impact strengths. It can be seen, by those skilled in the art, that the laminate layers containing elastomeric particles will become progressively weaker upon addition of more and more elastomer. One of the novel facets of this invention is that this weakening has virtually no effect upon the laminate's overall physical properties. Reverse impact strengthening has been achieved before noticeable laminate weakening occurs. The range of addition has been found to vary between 2 to 20 parts of elastomer per 100 parts of resin compound in the elastomer-containing layer and preferably 2 to 15 parts elastomer.

A new and novel method of obtaining elastomeric particles for dispersion in plastic laminates is the subject of another U.S. Pat. application, Ser. No. 766,946, titled METHOD OF CONVERTING ELASTOMERIC MATERIALS INTO POWDERS, assigned to the same assignee as this application. Generally, according to one aspect of that method, the required amount of elastomer is cut from a bale and dissolved (swollen) in an organic liquid to form a cement. Any liquid that dissolves or swells the elastomer is suitable. A filler, such as powdered calcium carbonate, is admixed to the cement to form a paste. This plate is placed on a heated, conventional smooth mill wherein the paste is formed into a thin sheet. The liquid is evaporated from the sheet and the substantially dry material scraped from the mill as thin flakes. The flakes are further dried and crushed to form a powder. The elastomeric powder thus produced is readily usable in this invention by simply mixing it into the polyester resin compound.

These and other aspects of the invention will become more apparent upon reading the following examples. These examples are provided herein to demonstrate how to practice the invention and are not to be construed as limiting the scope, applicability, or field of use thereof.

EXAMPLE 1

A polyester resin, the reaction product of isophthalic acid, maleic anhydride, and propylene glycol, was compounded according to the recipe below:

| | |
|---|---|
| Polyester Resin | 100.00 parts |
| Catalyst—2,5-dimethyl-hexane 2,5-diperoctoate (USP-245 Peroxygen Corp.) | 0.50 parts |
| Inhibitor p-benzoquinone | 0.02 parts |
| Lubricant calcium stearate | 5.00 parts |
| Filler calcium carbonate | 80.0 parts |
| Thickener (calcium oxide) | 5.00 parts |
| (water) | 0.30 parts |

A mat of 2-inch chopped glass fibers (chemically bonded, 1.0 oz./ft.$^2$) was impregnated with the above compound to a weight ratio of 100 parts of resin compound to 43 parts of glass. A three layered laminate was fabricated and cured at 275° F., under 600 p.s.i.g., for 3½ minutes. The reverse impact strength, flexural modulus, and impact strength are reported in table I below.

EXAMPLES 2–15

In examples 2–15 laminates similar to example 1 were made except that the elastomeric materials were physically dispersed in the resin compound, with a high shear mixer, prior to mat impregnation. Table I lists the reverse impact strength, flexural modulus, and impact strength of the cured laminates. The terms "all," "center," and "outer" in the column titled "type" indicate that the elastomeric material dispersion appears in all three laminate layers (all), only the center layer (center) and only the two outer laminate layers (outer).

TABLE I

| Example | Type of elastomer | Parts per 100 resin compound | Flexural modulus $\times 10^5$ p.s.i.[1] | Impact strength ft.-lb./in.[2] | Type | Reverse impact strength cracks at— inches | Experiment number |
|---|---|---|---|---|---|---|---|
| 1 | | | 1.31 | 9.33 | | 4 | |
| 2 | Powdered HYCAR 1411 [3] | 20 | 1.23 | 8.76 | Center | 4 | A-377-76B |
| 3 | Liquid nitrile rubber | 2 | | | All | 4 | A-337-10 |
| 4 | do | 5 | | | All | 4 | A-337-11 |
| 5 | Powdered HYCAR 1411 | 5 | | | Outer | 6 | A-454-6A |
| 6 | Powdered HYCAR 2007 [4] | 5 | 1.58 | 9.30 | All | 5 | A-299-25 |
| 7 | Powdered HYCAR 1411 | 8 | 1.33 | | Outer | 5 | A-266-138 |
| 8 | Powdered carboxylic-nitrile rubber | 10 | | | do | 8 | A-337-120 |
| 9 | Powdered GEN-FLO 701 [5] | 10 | 1.09 | 8.10 | do | 9 | A-337-87A |
| 10 | Powdered HYCAR 1411 | 14 | 1.14 | 7.50 | do | 7 | A-266-137 |
| 11 | do | 15 | 1.05 | | do | 10 | A-454-9A |
| 12 | Powdered GEN-FLO 67 [6] | 15 | 1.13 | 8.30 | do | 10 | A-377-87D |
| 13 | Powdered vistalon 3509 [7] | 15 | | | do | 16 | A-307-40 |
| 14 | Powdered natural rubber | 15 | 1.27 | | do | 16 | A-454-36 |
| 15 | Powdered HYCAR 1411 | 20 | 0.75 | 8.66 | do | 16 | A-377-67D |

[1] ASTM-D790-66.
[2] ASTM-D256.
[3] A high acrylonitrile copolymer (B. F. Goodrich Chemical Co.).
[4] A 50/50 high styrene resin/SBR rubber blend (B. F. Goodrich Chemical Co.).
[5] A modified styrene-butadiene copolymer (The General Tire & Rubber Co.).
[6] A styrene-butadiene copolymer (The General Tire & Rubber Co.).
[7] A 55% ethylene rubber (Enjay Chemical Co.).

What is claimed is:

1. A hard surfaced laminate possessing a high reverse impact strength, consisting of layers of cured thermosetting resin compound wherein alternate layers and the outermost layers thereof contain a uniform physical dispersion of from 2 to 20 parts by weight of normally solid elastomeric particles per 100 parts by weight of thermosetting resin in the specific layer containing said particles, having a mean particle diameter between 0.1 and 300 microns, said normally solid elastomeric particles having been added to the uncured liquid resin in solid form.

2. The laminate of claim 1, wherein said cured layers of thermosetting resin compound contain reinforcing fibers.

3. The laminate of claim 2, wherein said reinforcing fibers are glass fibers.

4. The laminate, as described in any one of claims 1, 2 and 3, wherein said normally solid elastomeric particles are present in the amount of 2 to 15 parts by weight per 100 parts by weight of said thermosetting resin in the specific layer containing said particles, said normally solid elastomeric particles having been added to the uncured liquid resin in solid form.

5. In a hard surfaced plastic laminate, consisting of cured layers of fiber-reinforced thermosetting resin compound, a method of improving the laminates' overall reverse impact strength, comprising physically dispersing from 2 to 20 parts by weight of normally solid elastomeric particles having a mean particle diameter between 0.1 and 300 microns per 100 parts by weight of said thermosetting resin in alternate layers and in the cover layers during formation of said laminate, said normally solid elastomeric particles having been added to the uncured liquid resin in solid form.

6. The laminate, as described in any one of claims 1, 2, and 3 wherein said thermosetting resin compound comprises a polyester resin.

* * * * *

PO-1050
(5/69)

UNITED STATES PATENT OFFICE
CERTIFICATE OF CORRECTION

Patent No. 3,620,900     Dated November 16, 1971

Inventor(s) Ervin J. Williger

It is certified that error appears in the above-identified patent and that said Letters Patent are hereby corrected as shown below:

In Column 1, line 69, the words "finder tops" should read --fender tops---.
In Column 3, line 14, the words "fiber reinforcing" should read --fiber reinforcement---.
In Column 4, line 53, the sentence "The presence of the surface is occupied by polyester resin." should be deleted; it is not in the Specification.
In Column 5, line 27, the phrase "as to crack formers" should read ---as to be crack formers---.
In Column 6, line 3, the word "plate" should read --paste---.

Signed and sealed this 27th day of June 1972.

(SEAL)
Attest:

EDWARD M.FLETCHER,JR.
Attesting Officer

ROBERT GOTTSCHALK
Commissioner of Patents